(12) United States Patent
Geringer et al.

(10) Patent No.: US 9,183,435 B2
(45) Date of Patent: Nov. 10, 2015

(54) FEATURE GENERALIZATION USING TOPOLOGICAL MODEL

(71) Applicant: ORACLE INTERNATIONAL CORPORATION, Redwood Shores, CA (US)

(72) Inventors: Daniel Louis Geringer, Germantown, MD (US); Siva Ravada, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 77 days.

(21) Appl. No.: 14/097,388

(22) Filed: Dec. 5, 2013

(65) Prior Publication Data

US 2015/0161438 A1 Jun. 11, 2015

(51) Int. Cl.
| | |
|---|---|
| *G06K 9/00* | (2006.01) |
| *G06K 9/46* | (2006.01) |
| *G06K 9/62* | (2006.01) |
| *G06F 17/30* | (2006.01) |
| *G06T 17/05* | (2011.01) |

(52) U.S. Cl.
CPC ...... *G06K 9/00442* (2013.01); *G06F 17/30259* (2013.01); *G06K 9/46* (2013.01); *G06K 9/6202* (2013.01); *G06T 17/05* (2013.01)

(58) Field of Classification Search
None
See application file for complete search history.

(56) References Cited

U.S. PATENT DOCUMENTS

| | | | | |
|---|---|---|---|---|
| 5,473,739 | A * | 12/1995 | Hsu | 345/619 |
| 6,016,153 | A * | 1/2000 | Gueziec et al. | 345/441 |
| 6,553,337 | B1 * | 4/2003 | Lounsbery | 703/2 |
| 7,215,810 | B2 * | 5/2007 | Kaufmann et al. | 382/154 |
| 8,294,726 | B2 * | 10/2012 | Burley et al. | 345/582 |
| 2008/0281839 | A1 * | 11/2008 | Bevan et al. | 707/100 |
| 2010/0299370 | A1 * | 11/2010 | Otto | 707/803 |
| 2012/0144355 | A1 * | 6/2012 | Dai et al. | 716/112 |
| 2013/0266230 | A1 * | 10/2013 | Peters et al. | 382/224 |
| 2013/0307848 | A1 * | 11/2013 | Tena et al. | 345/420 |
| 2014/0267375 | A1 * | 9/2014 | Kilgard et al. | 345/611 |

\* cited by examiner

*Primary Examiner* — Shervin Nakhjavan
(74) *Attorney, Agent, or Firm* — Kraguljac Law Group, LLC (57) ABSTRACT

Systems, methods, and other embodiments associated with feature generalization leveraging topological model functionality are described. In one embodiment, a method includes loading primitives associated with a first feature and a second feature into a topological model. The topological model may be an existing topological model or a topological model that is created by the feature generalization methods and systems described herein. The topological model stores primitives that are shared by the first feature and the second feature as a single unique shared primitive. The method includes generalizing respective primitives including at least one shared primitive to produce corresponding respective generalized primitives, and associating a generalized primitive corresponding to the shared primitive with the first feature and the second feature, while maintaining alignment across shared edges of adjacent features and hierarchical relationships between features.

32 Claims, 7 Drawing Sheets

Figure 1

Node Table 220

| ID | x,y |
|---|---|
| N1 | -4,4 |
| N3 | -3,4 |
| ------ | ------ |
| N34 | 0,0 |
| N35 | -3.5,3 |
| N36 | 5,1 |
| N37 | 4,2 |

Edge Table 230

| ID | End Node 1 | End Node 2 | Shape Points |
|---|---|---|---|
| 1 | N1 | N3 | N1,S1,N3 |
| 2 | N3 | N9 | N3,S2,S3,S4,S5,S6,N9 |
| 3 | N9 | N12 | N9,S7,S8,N12 |
| 4 | N12 | N16 | N12,S9,S10,S11,N16 |
| 5 | N16 | N18 | N16,S12,N18 |
| 6 | N18 | N21 | N18,S13,S14,N21 |
| 7 | N21 | N1 | N21,S15,S16,S17,S18,S19,N1 |
| 8 | N3 | N28 | N3,S20,N28 |
| 9 | N28 | N31 | N28,S21,S22,N31 |
| 10 | N31 | N18 | N31,S23,S24,N18 |

Face Table 235

| ID | Edge list |
|---|---|
| 1 | 1,8,9,10,6,7 |
| 2 | 2,3,4,5,10,9,8 |

County Feature Table 240

| ID | FACE |
|---|---|
| COUNTY A | 1 |
| COUNTY B | 2 |

State Feature Table 245

| ID | county ID |
|---|---|
| STATE A | COUNTY A, COUNTY B |

Figure 2A

Node Table 220

| ID | x,y |
|---|---|
| N1 | -4,4 |
| N3 | -3,4 |
| ------- | ------- |
| N34 | 0,0 |
| N35 | -3.5,3 |
| N36 | 5,1 |
| N37 | 4,2 |

Edge Table 230

| ID | End Node 1 | End Node 2 | Shape Points |
|---|---|---|---|
| 1 | N1 | N3 | N1,S1,N3 |
| 2 | N3 | N9 | N3,S2,S3,S4,S5,S6,N9 |
| 3 | N9 | N12 | N9,S7,S8,N12 |
| 4 | N12 | N16 | N12,S9,S10,S11,N16 |
| 5 | N16 | N18 | N16,S12,N18 |
| 6 | N18 | N21 | N18,S13,S14,N21 |
| 7 | N21 | N1 | N21,S15,S16,S17,S18,S19,N1 |
| 8 | N3 | N28 | N3,~~S20~~,N28 |
| 9 | N28 | N31 | N28,S21,~~S22~~,N31 |
| 10 | N31 | N18 | N31,S23,~~S24~~,N18 |

Face Table 235

| ID | Edge list |
|---|---|
| 1 | 1,8,9,10,6,7 |
| 2 | 2,3,4,5,10,9,8 |

County Feature Table 240

| ID | FACE |
|---|---|
| COUNTY A | 1 |
| COUNTY B | 2 |

State Feature Table 245

| ID | county ID |
|---|---|
| STATE A | COUNTY A, COUNTY B |

Figure 2B

Node Table 220

| ID | x,y |
|---|---|
| N1 | -4,4 |
| N3 | -3,4 |
| ------- | ------- |
| N34 | 0,0 |
| N35 | -3.5,3 |
| N36 | 5,1 |
| N37 | 4,2 |

Edge Table 230

| ID | End Node 1 | End Node 2 | Shape Points |
|---|---|---|---|
| 1 | N1 | N3 | N1,S1,N3 |
| 2 | N3 | N9 | N3,S2,S3,S4,S5,S6,N9 |
| 3 | N9 | N12 | N9,S7,S8,N12 |
| 4 | N12 | N16 | N12,S9,S10,S11,N16 |
| 5 | N16 | N18 | N16,S12,N18 |
| 6 | N18 | N21 | N18,S13,S14,N21 |
| 7 | N21 | N1 | N21,S15,S16,S17,S18,S19,N1 |
| 8 | N3 | N28 | N3,~~S20~~,N28 |
| 9 | N28 | N31 | N28,S21,S22,N31 |
| 10 | N31 | N18 | N31,S23,~~S24~~,N18 |

Face Table 235

| ID | Edge list |
|---|---|
| 1 | 1,8,9,10,6,7 |
| 2 | 2,3,4,5,10,9,8 |

County Feature Table 240

| ID | FACE |
|---|---|
| COUNTY A | 1 |
| COUNTY B | 2 |

State Feature Table 245

| ID | county ID |
|---|---|
| STATE A | COUNTY A, COUNTY B |

FEATURE GENERALIZATION USING TOPOLOGICAL MODEL

BACKGROUND

Spatial databases store geographical and topological data to support map rendering and navigational applications. A major consideration when rendering spatial data is to decide which layers to display at a particular zoom level on a map. For example, a layer may include very detailed polygonal features with about 3000 features in each polygon. When the zoom level is very far away (e.g., "zoomed out"), the preferred practice is not display these very detailed polygons because the detail of the polygons is lost due to the limited resolution of the display. Many of the polygon vertices are rendered onto just a few display pixels. In addition, transferring the large number of vertices associated with detailed polygonal features at a high zoom level can introduce a network bottleneck.

A more realistic scenario is to use zoom control to only "turn on" the detailed polygons when reasonably zoomed in, and to display a generalized, less detailed representation of the polygons when zoomed further out. This can be accomplished by generating a generalized version of the detailed polygon layer. The generalized layer is displayed when the display is zoomed out. Correct usage of zoom control and generalized layers can produce better map generation performance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

In topological spatial databases, features, for examples states, counties, cities, streets, and so on, are often stored as a collection of "primitives" such as nodes, edges, and faces (or polygons). A node primitive is a single vertex. An edge primitive is bounded by two end node primitives, (e.g., a start node and an end node, in some embodiments in which an edge primitive conveys a sense of direction). Each edge primitive can also contain additional shape points which define the edge shape between the end nodes. In a topology, edges only intersect other edges at either a start or end node, and not along intermediate shape points. The more nodes an edge primitive has the more detailed the edge primitive is, resulting in fine detail for any features to which the edge primitive belongs. When edge primitives form an enclosed area, a face (or polygonal) primitive is generated. Polygonal features such as features corresponding to counties and states are comprised of a set of face primitives.

Storing only detailed versions of features with large numbers of nodes is not always optimal, especially for map rendering applications. When a display is zoomed out in a mapping application, rendering very detailed features requires large quantities of disk space, memory, and network bandwidth. It also slows spatial computation for comparing and processing detailed features. Thus, many spatial databases that support mapping and navigational applications store simplified versions of features that require less data at the cost of reduced feature resolution for use when a display is zoomed out.

One technique that reduces the amount of data used to store features is feature generalization. Feature generalization is the process of applying a thinning or smoothing algorithm to shape nodes of edge primitives with high vertex counts. The end nodes of the edge primitive are not changed and the goal is to generate edge primitives with reduced node counts, while maintaining a shape similar to the original edge primitive. Fewer nodes lead to faster rendering due to a reduction in the amount of data that must be transferred over the network. Fewer vertices also increase the performance of computations that use the primitive to determine the relationship between features.

One major challenge to feature generalization is maintaining the alignment of shared edges of adjacent features. For example, consider two adjacent counties C1 and C2 with a shared border P1. If the counties are generalized separately, it is very likely that the generalized version of P1 for C1 will be different from the generalized version of P1 for C2. When the counties C1 and C2 are rendered, the border P1 would no longer be aligned.

Feature generalization sometimes causes a violation of topological relationships between features. If county C1 has a town T1 very near the border P1, generalization of P1 may cause T1 to fall outside the boundaries of C1. Hierarchical relationships are also an issue with feature generalization. In a county, state, country hierarchy a state is defined as a collection of its counties and a country is defined as a collection of its states. When the counties are generalized outside the context of the state, the county borders may no longer align with, or be contained within, the state boundary.

Systems and methods are described herein that perform feature generalization while maintaining the alignment of shared edges as well as the topological and hierarchical relationships between features. This is accomplished by leveraging functionality that may be provided by a topological model during the feature generalization process. A topological model used for feature generalization may be an existing topological model or functions of a topological model that are performed by the feature generalization methods and systems described herein. Multiple features are generalized in the same generalization process, ensuring that shared edges are aligned and topological and hierarchical relationships are maintained.

Figure 1:
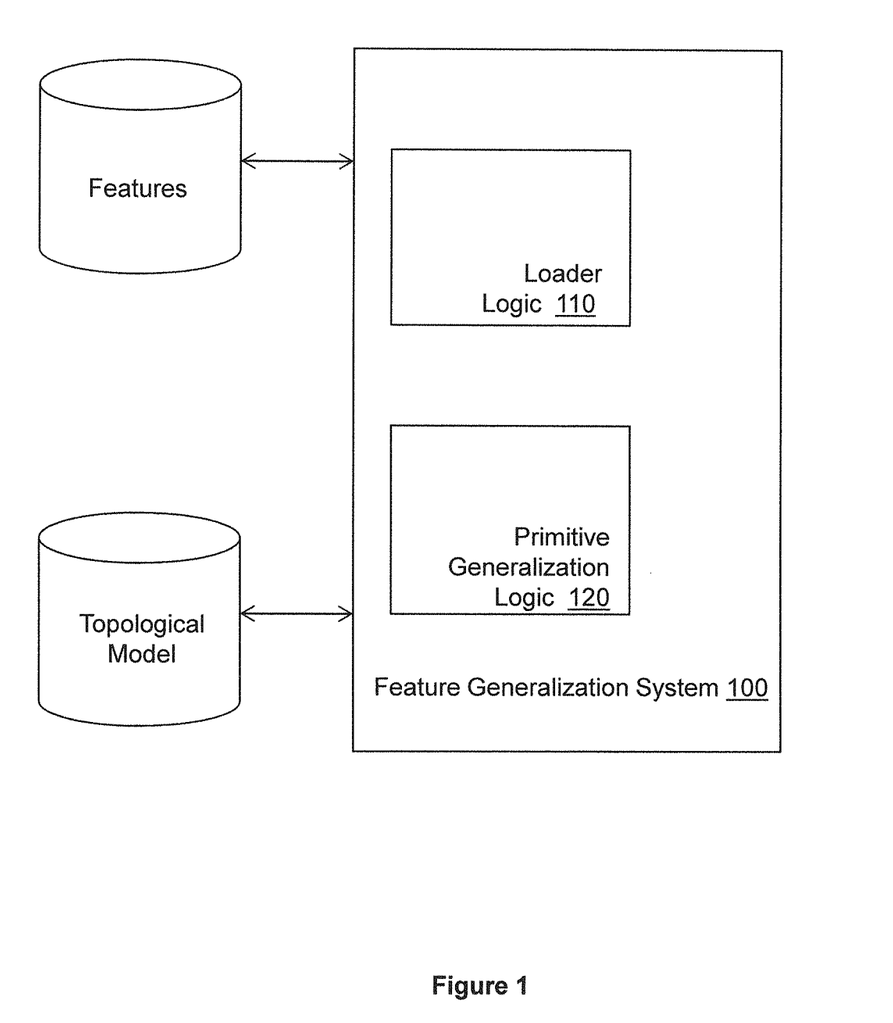
FIG. 1 illustrates one embodiment of a system that performs feature generalization using a topological model.

With reference to FIG. 1, one embodiment of a feature generalization system 100 that performs feature generalization using an existing topological model is illustrated. The feature generalization system 100 includes loader logic 110 and primitive generalization logic 120. The logic of the feature generalization system 100 may be installed in a computer processor and cause the computer processor to perform various functions. The loader logic 110 may be an API configured to decompose features into primitives and load primitives into a topological model for generalization. The loader logic 110 is configured to access stored geographical feature data that describes a set of features. The loader logic 110 is configured to load un-generalized primitives for the features into a topological model. In one embodiment, once the primitives are generalized, the loader logic 110 is configured to generate and store generalized features from generalized primitives for use in future processing.

For the purposes of this description, a topological model is used to perform the primitive generalization. However, it is not necessary to use a topological model, in fact any component or logic (not shown) that provides a limited set of topological model functions (e.g., shared edge generalization and enforcement of topological relationships) may be used for the purpose of generalizing primitives.

Figure 2A:
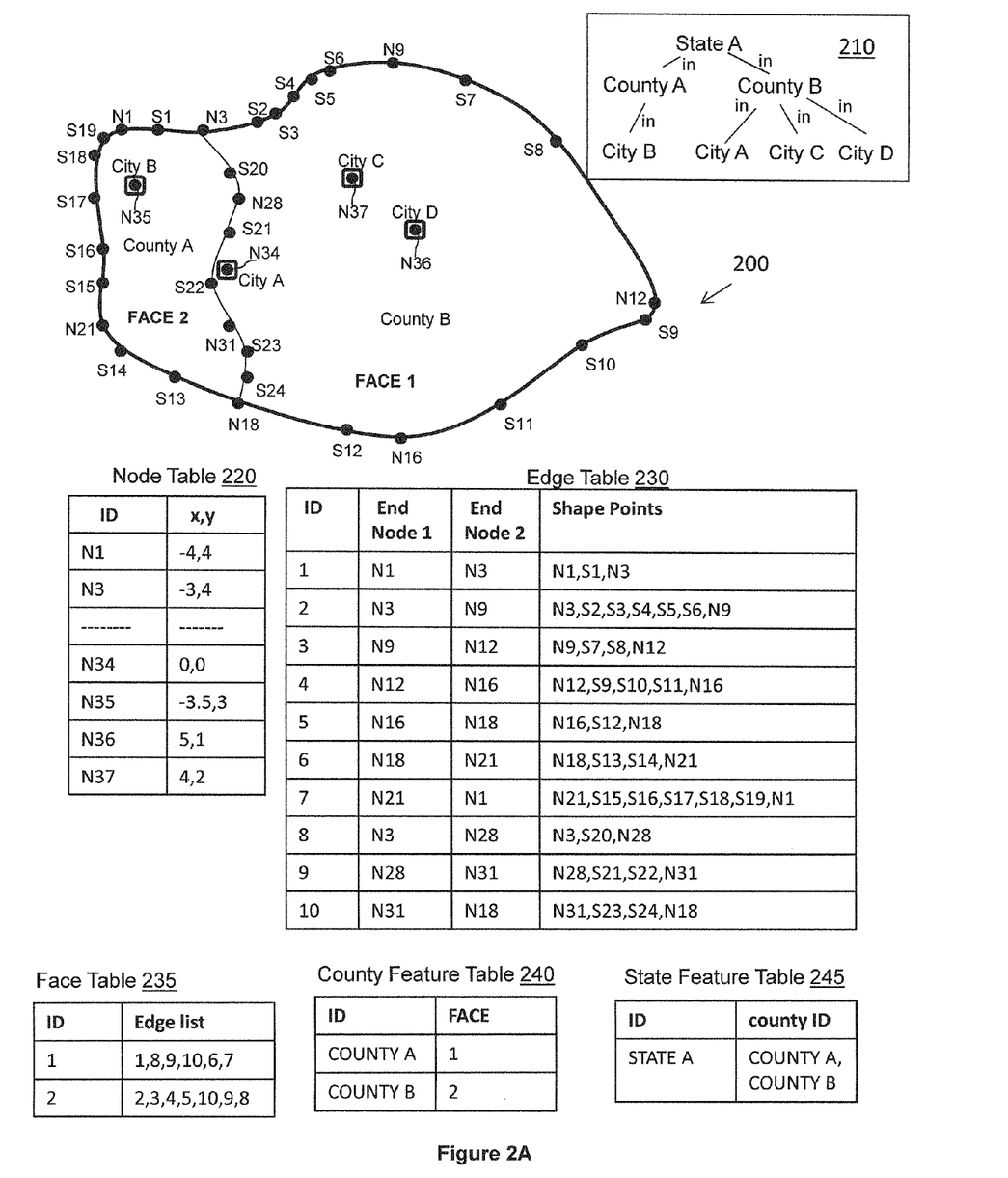
FIGS. 2A-2C illustrate an example of feature generalization using a topological model.

FIG. 2A illustrates a simplified example of how spatial data for a State A may be stored in a topological model. The topological model includes a node table 220, an edge table 230, a face table 235, a county feature table 240, and a state feature table 245. The node table 220 stores coordinates of nodes. The edge table 230 stores edges, each with a pair of end nodes and a set of shape points which define the shape of the edge. The face table 235 stores a list of edge identifiers that form a polygonal region or face. Faces in a topological model are automatically generated when edge primitives from enclosed polygonal regions.

The county feature table 240 stores data for County A in the first row and County B in the second row. Each county feature is comprised of a face primitive. The State Feature table 245 contains a hierarchical feature called State A. State A is made up of a set of counties, County A and County B. Any changes to the edge primitives that make up the face primitives that the County A and County B features point to is transparently reflected in the State A, a hierarchical feature. In some embodiments, the feature table stores pointers to a set of edges in the edge table 230 instead of a set of faces. For example, a road feature table would contain road features, each pointing to a set of edge primitives instead of a set of face primitives.

The topological model stores primitives for features in the node table 220, the edge table 230, and the face table 235. Thus, when County A is loaded into the topological model, Edge 1 is recorded in the edge table 230 with N1 being the first end node (or vertex) of Edge 1, N3 being the second end node of Edge 1, and N1, S2, and N3 being shape points of Edge 1. The coordinates of the end nodes of Edge 1, N1 and N3, are recorded in the node table. This process continues until all nodes and edges of County A are recorded in the node table 220 and the edge table 230. The edges 1, 8, 9, 10, 6, 7 associated with County A form a closed region, which populates Face 1 in the face table 235. County A is stored in the county feature table 240, with a list of faces associated with County A. In this example, County A is associated with only one face, Face 1. Node 35 is stored in the node table 220 for City B.

An important feature of the topological model is that shared edges are assigned a single unique identifier. The shared edge is stored in a single row of the edge table. Thus, when the primitives for County A and County B are loaded into the topological model, edges 8, 9, and 10 that were generated for County A are reused and shared with County B. A single version of the edges 8, 9, and 10 are stored for both County A and County B in the edge table 230 and the face table 235 uses the common identifier for the edges in the rows for Face 1 and Face 2. The edges 2, 3, 4, and 5 that County B does not share with County A are stored in the edge table 230. The edges' end nodes are stored in the node table 220. Nodes corresponding to City A, City C, and City D are also stored in the node table.

When State A is loaded into the topological model, no new edges are stored because all of the edges are already stored by virtue of County A and County B being loaded into the topological model. The topological model is configured to store and maintain topological relationships as represented by the tree 210. The topological relationships define County A and County B as being in State A. City B is defined as being in County A and Cities A, C, and D are defined as being in County B. Any topological primitive edit operation, for example, changing the shape points of an edge primitive in a way that modifies the topological relationships represented by the tree 210 will cause the topological model to raise an error. Note that a hierarchical relationship also exists between Counties A and B and State A because State A is the sum of Counties A and B.

In one embodiment, an existing topological model is not used, and the loader logic 110 creates a simplified topological model that provides selected features that facilitate feature generalization. In this embodiment, the loader logic may identify shared original primitives that are common to two or more features and assign respective single unique identifiers to respective shared primitives. Thus, when a shared primitive is generalized, a single generalized shared primitive results. In this embodiment, the loader logic 110 stores topological relationships like the ones described by the tree 210. These relationships are enforced during feature generalization.

Returning to FIG. 1, the primitive generalization logic 120 generalizes the features within the context of the topological model and in doing so leverages advantageous features of the topological model to ensure that shared edges are aligned and topological and hierarchical relationships are maintained. The primitive generalization logic 120 operates on primitives for many features stored in the topological model, not on separate sets of primitives on a per-feature basis. Once the edge primitives have been generalized, the loader logic 110 is configured to generate generalized features based on generalized edge primitives stored in the topological model.

The primitive generalization logic 120 is configured to generalize features by generalizing edge primitives loaded into the topological model. In one embodiment, the primitive generalization logic 120 acts on the edges in the edge table 230. The primitive generalization logic 120 calls a generalization or thinning routine to smooth some or all of the shape points of edges in the edge table 230. During edge shape point generalization, the end nodes of the edge are not modified. Shape points non inclusive of the edges' end nodes are generalized.

In one embodiment, an edge is smoothed by eliminating some of the shape points for the edge while maintaining the end nodes. In the spatial option to Oracle® Database calling the CHANGE_EDGE_COORDS routine will selectively eliminate shape points in a first set of shape points describing an edge to create a second set of shape points that has fewer vertices than the first set while maintaining the edge's end nodes. This routine is based on the Douglas-Peucker algorithm as described in *Algorithms for the Reduction of the Number of Points Required to Represent a Digitized Line or Its Caricature*, by David Douglas & Thomas Peucker (The Canadian Cartographer 10(2), 112-122 (1973)). In other embodiments, edges can be smoothed by replacing shape points with a second, smaller set of shape points that approximates the shape of the edge. In these embodiments, the second set of shape points may include shape points that were not part of the first, original set of shape points for an edge.

Figure 2B:
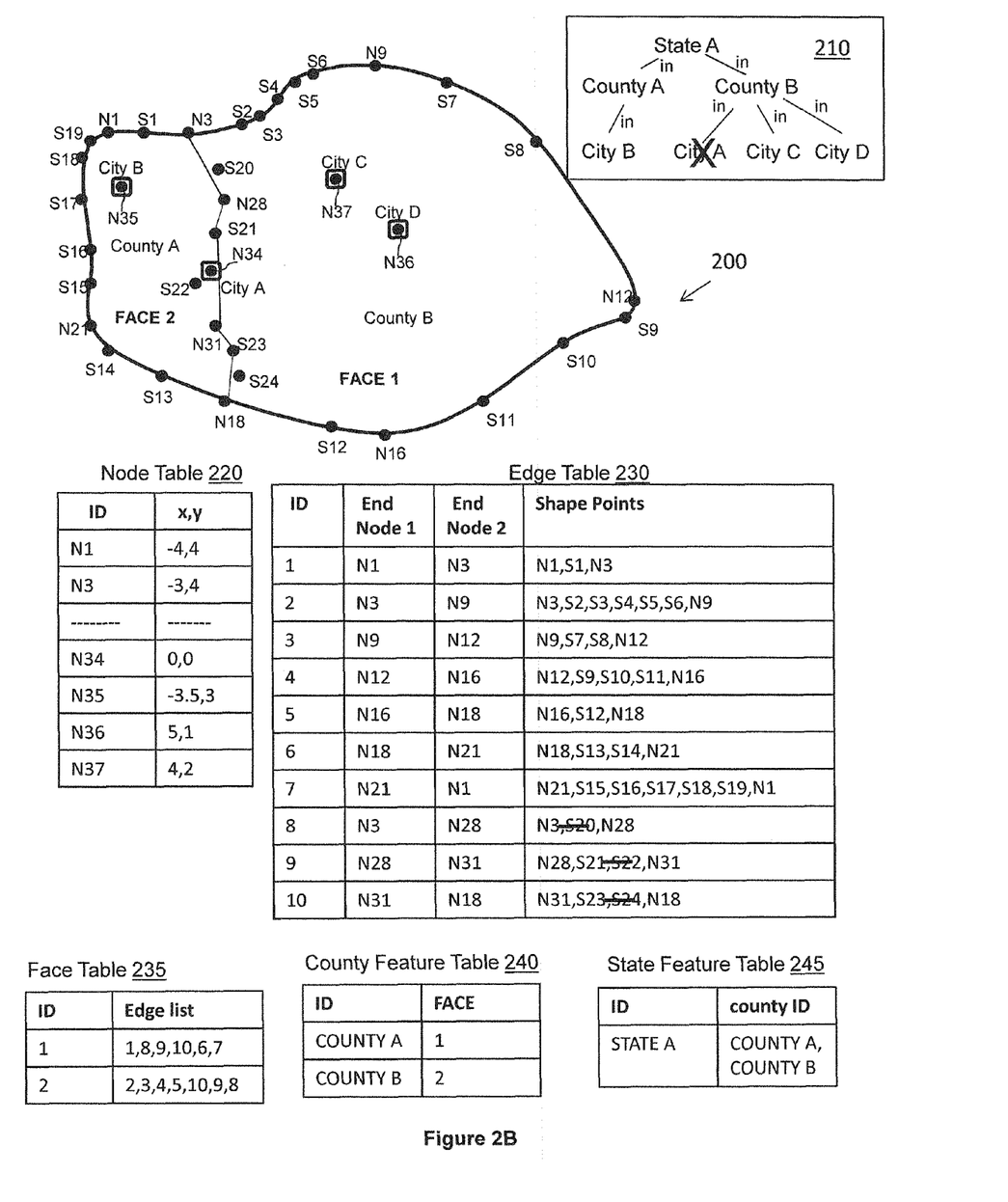
Figure 2C:
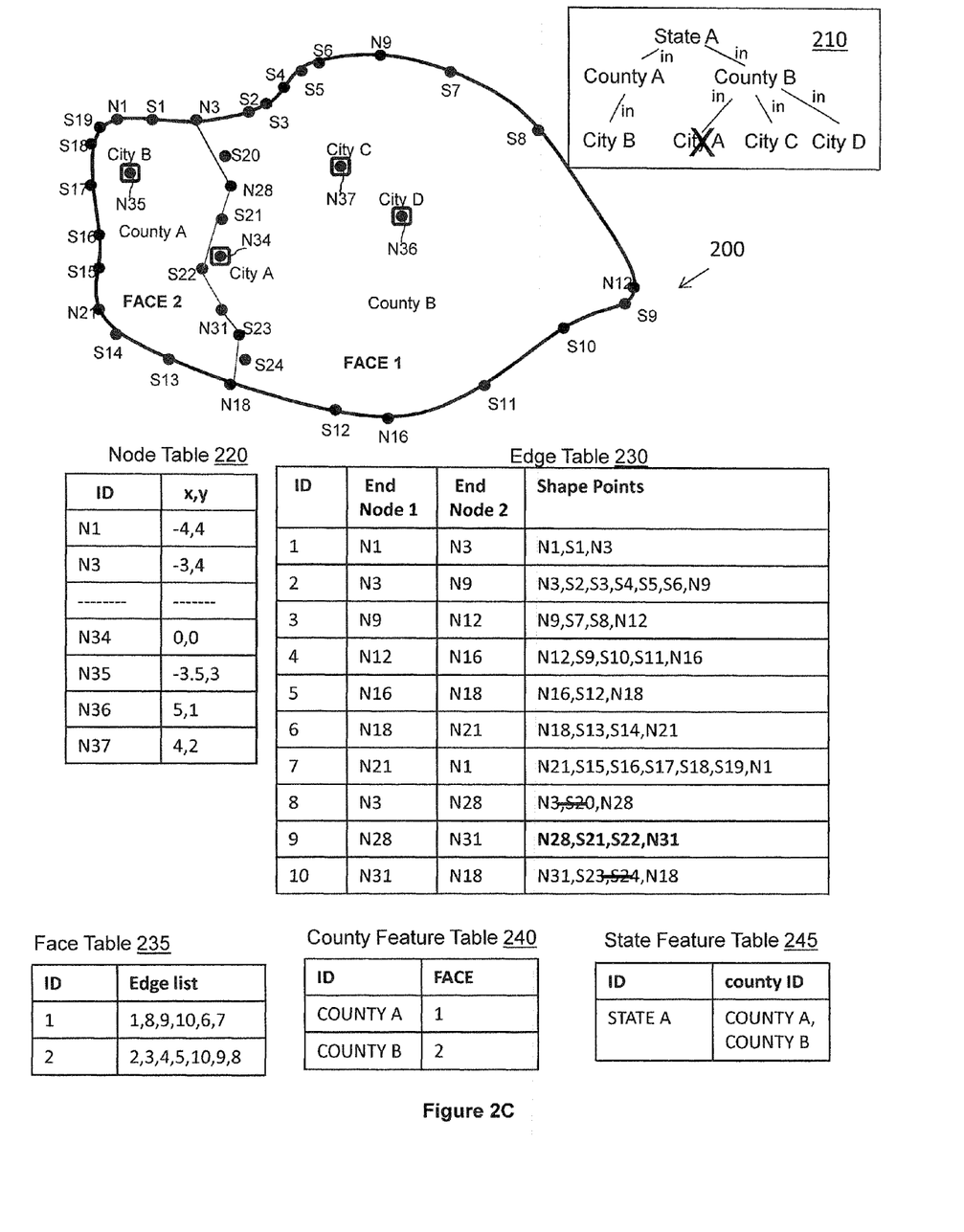

FIGS. 2B and 2C are a progression that illustrates one example of how the edges in the edge table 230 of FIG. 2A might be smoothed by the primitive generalization logic 120. Each edge/row in the edge table 230 is smoothed in turn by calling a thinning routine, and the edge's shape points are replaced with a smaller set of shape points output by the routine. The resulting simplified edges produce the less detailed version of County A and County B shown in FIG. 2B.

Because the shared edges are treated as single unique entities, each shared edge's shape points are generalized to produce a single shared generalized edge. Thus the shared border edges between the counties and the state remain aligned because they share the same generalized representation. Also, the hierarchical relationship between Counties A and B and State A is maintained because the borders of State A remain common with the corresponding borders of Counties A and B. Thus State A is still properly represented as the sum of Counties A and B and Counties A and B are still completely contained within State A.

Because the generalization process is performed within the context of the topological model, when any topological relationship like the ones described in the tree 210 is violated by a generalized edge, an error will be raised by the topological model. In FIG. 2B, it can be seen that the generalization of edge 9 places City A in County A, which is a violation of the topological relationship shown in tree 210. The topological model will raise an error with respect to edge 9 and the edge will not be generalized. Rather, edge 9 will remain stored as its original set of shape points as shown in FIG. 2C. In some embodiments, an alternative smoothing algorithm may be applied in an attempt to smooth the edge to produce a generalized edge that does not violate a topological relationship. In this manner, topological relationships are maintained by only generalizing edges when doing so will not violate a topological relationship.

Figure 3:
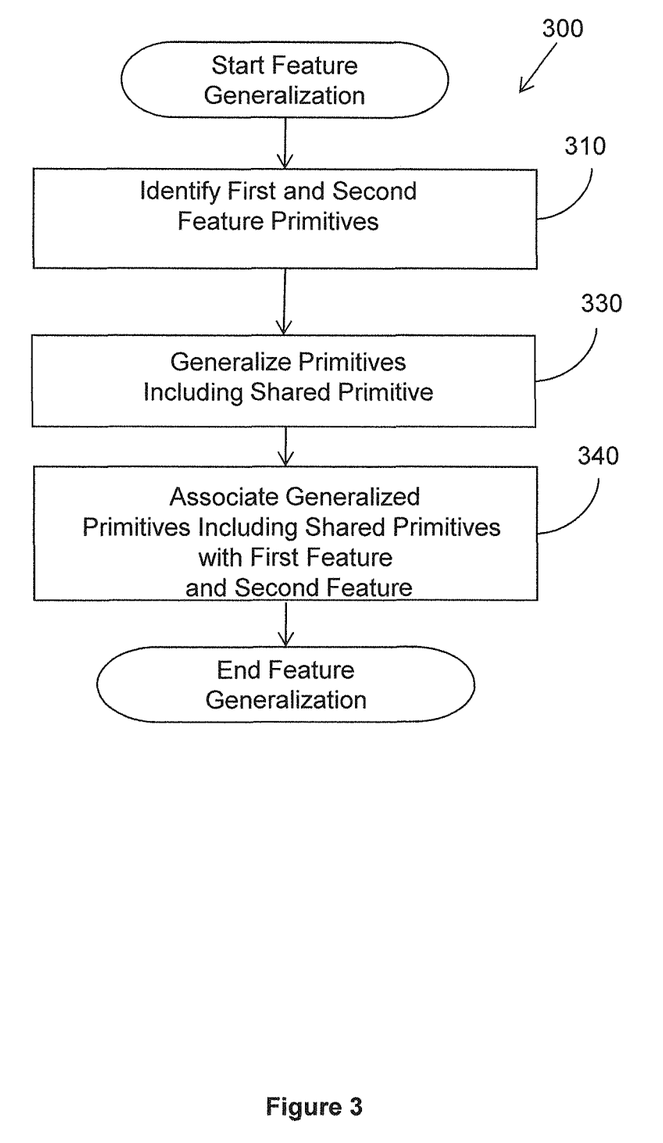
FIG. 3 illustrates one embodiment of a method associated with feature generalization using a topological model.

FIG. 3 illustrates one example embodiment of a method 300 that uses a topological model to generalize features while maintaining alignment of and topological relationships between features. The method 300 may be performed by the feature generalization system 100 of FIG. 1. The method 300 includes, at 310, identifying primitives associated with a first feature and a second feature. The first and second features may be loaded into a topological model or a logic/component that performs topological model type features such that primitives that are shared by the first feature and the second feature are stored as a single unique shared primitive. At 330, respective edge primitives including a shared primitive and other primitives are generalized to produce respective generalized edge primitives. At 340, the method includes associating generalized primitives, including the shared generalized primitive with the features.

In some embodiments, the topological model is configured to maintain topological relationships between primitives, such that when generalizing shaping points of an original edge primitive will violate a topological relationship of the original edge primitive with respect to another primitive stored in the model, the resulting generalized primitive is discarded and the original primitive is retained.

The topological model is configured to maintain hierarchical relationships between features. Hierarchical features point to a set of features, not primitives. If the primitives associated with a set of features that make up a hierarchical feature are generalized, the hierarchical feature is implicitly generalized. For example, a state hierarchical feature is composed of a set of two county features. If each county features points to primitives that get generalized, the county features are then generalized, as well as the hierarchical state feature that points to the counties.

In one embodiment, the topological model includes a node table configured to store nodes, where each node is associated with one or more features and an edge table configured to store feature edges as a pair of end nodes and a set of shape points. Each edge is associated with one or more features. In this embodiment, generalizing of an edge is performed by selecting the set of shape points corresponding to the edge from the edge table; smoothing the edge shape points to create a second set of shape points that includes fewer vertices than the first set of shape points; and storing the second set of shape points in the edge table such that the second set of shape points corresponds to the edge in the edge table. The end nodes of an edge are not modified by the smoothing process. The smoothing may be accomplished by performing the Douglas-Peucker algorithm on the edge.

In one embodiment, the generalizing includes, for each edge associated with one or more features in the edge table, generalizing the edge shape points to create a corresponding generalized edge; and storing the generalized edge in the edge table such that the generalized edge is associated with the one or more features.

Figure 4:
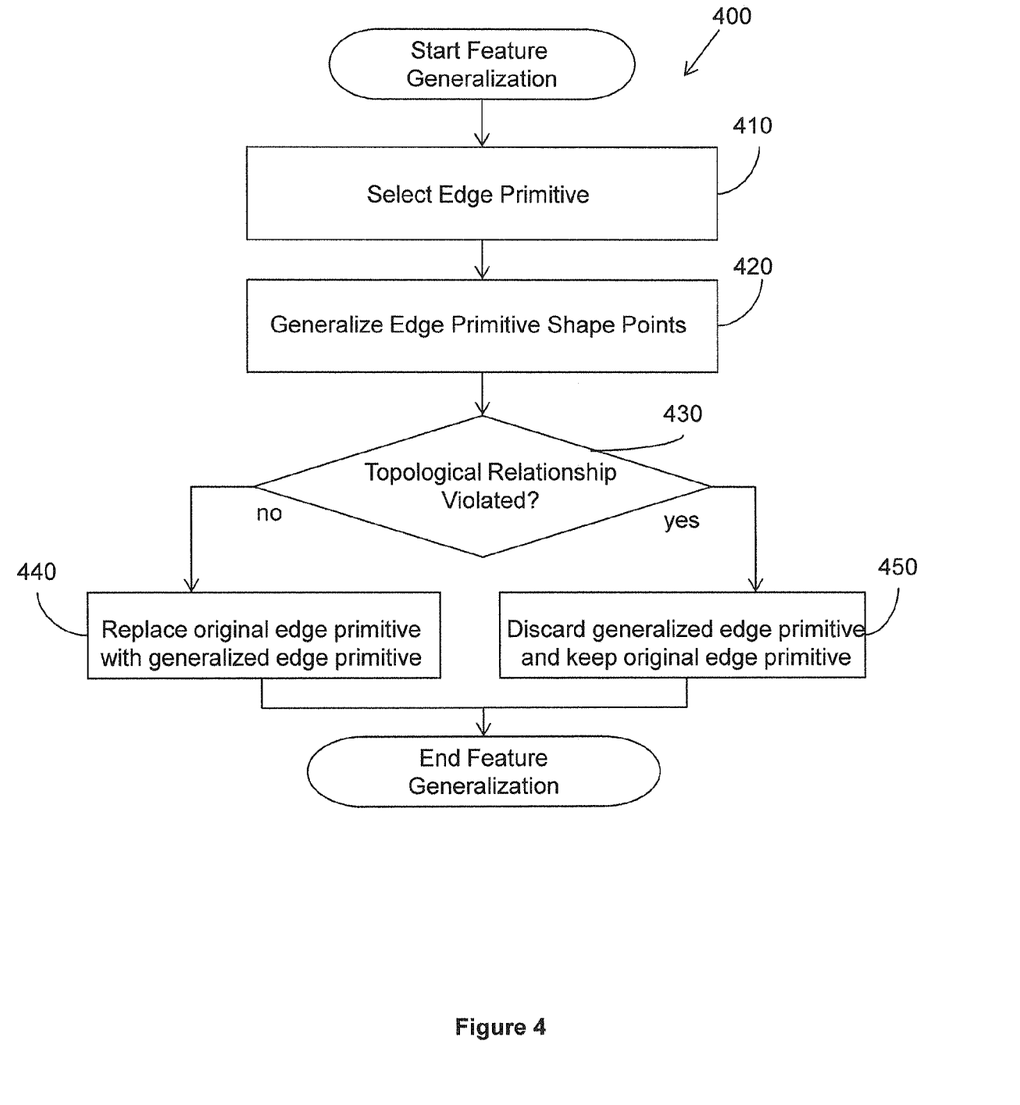
FIG. 4 illustrates an embodiment of a method that performs feature generalization while maintaining topological relationships of features.

FIG. 4 illustrates one example embodiment of a method 400 that generalizes features using functionality provided by a topological model that leaves edge primitives unchanged when a generalized version of an edge primitive violates a topological relationship. The method includes, at 410, selecting for generalization an original edge primitive, where a feature associated with the original edge primitive is subject to one or more topological rules. At 420, the method includes generalizing the original primitive to produce a corresponding generalized primitive. At 430, the method includes determining whether the generalized primitive violates a topological rule. When the generalized primitive does not violate a topological rule, at 440 the method includes replacing the original primitive with the generalized primitive. When the generalized primitive violates a topological rule, at 450 the method includes discarding the generalized primitive and retaining the original shared primitive in the topological model.

The method may include steps that create a simple topological model framework that provides some topological model functions. Feature generalization may be performed within this framework. For example, the method 400 may include identifying shared original primitives that are common to two or more features and assigning respective single unique identifiers to respective shared primitives. In this manner, when a shared primitive is generalized, a single generalized shared primitive results. Respective generalized shared primitives are associated with the respective two or more features that include the respective shared primitives.

The method 400 may include creating a node table configured to store nodes, where each node is associated with one or more features and an edge table configured to store feature edges as a pair of end nodes and a set of shape points, where each edge is associated with one or more features. A first set of shape points corresponding to an original edge is selected from the edge table and smoothed to create a second set of shape points that includes fewer vertices than the first set of shape points. The second set of shape points is stored in the edge table such that the second set of shape points corresponds to the edge in the edge table.

As can be seen from the foregoing description, the systems and methods herein leverage topological model functionality to perform feature generalization in manner that preserves feature alignment, topological relationships between features as well as hierarchical relationships between features.

Computer Embodiment

Figure 5:
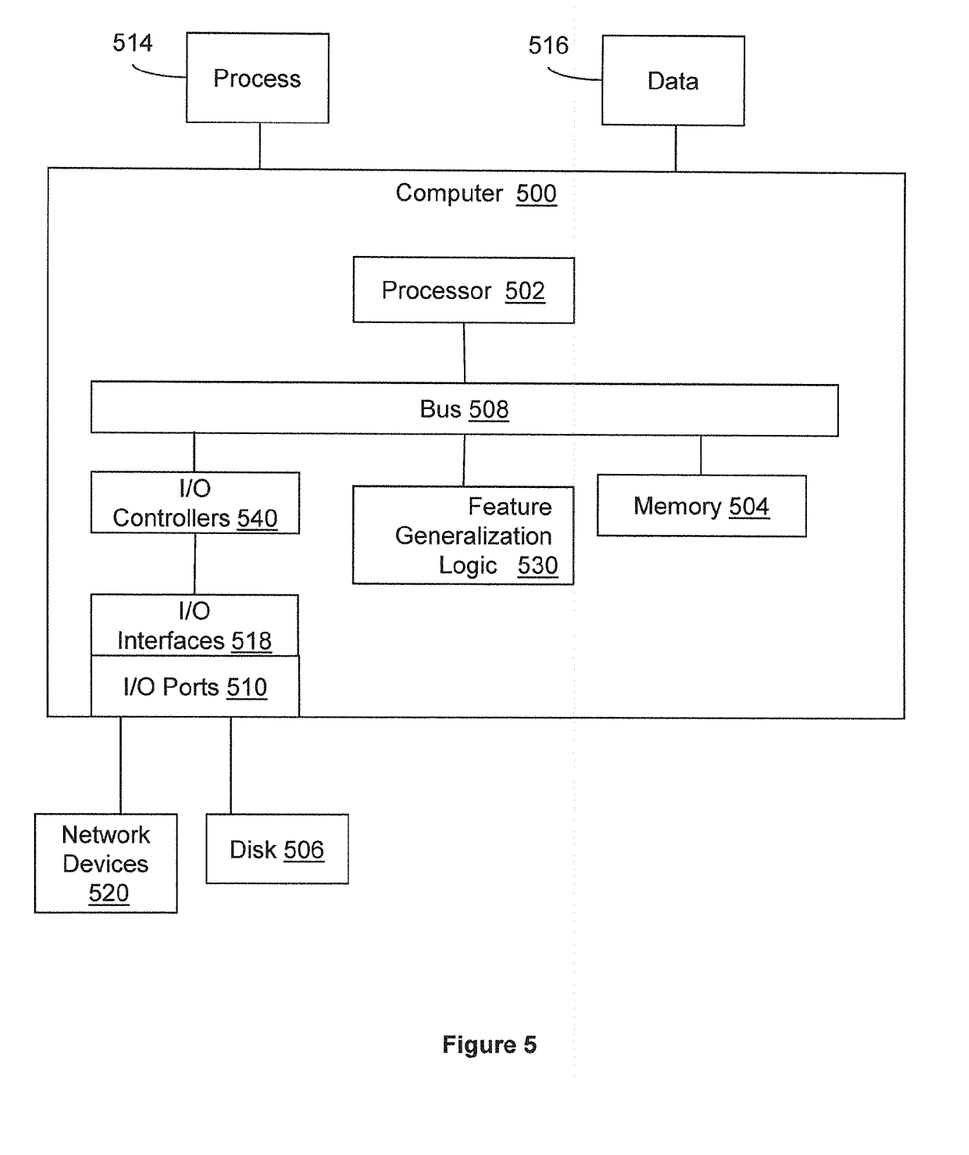
FIG. 5 illustrates an embodiment of a computing system in which example systems and methods, and equivalents, may operate.

FIG. 5 illustrates an example computing device that is configured and/or programmed with one or more of the example systems and methods described herein, and/or equivalents. The example computing device may be a computer 500 that includes a processor 502, a memory 504, and input/output ports 510 connected by a bus 508. In one example, the computer 500 may include feature generalization logic 530 configured to facilitate feature generalization in a manner similar to the systems and methods described in FIGS. 1-4. In different examples, the logic 530 may be implemented in hardware, a non-transitory computer-readable medium with stored instructions, firmware, and/or combinations thereof. While the logic 530 is illustrated as a hardware component attached to the bus 508, it is to be appreciated that in one example, the logic 530 could be implemented in the processor 502.

In one embodiment, logic 530 or the computer is a means (e.g., hardware, non-transitory computer-readable medium, firmware) for performing feature generalization using a topological model. The logic 530 or the computer is a means for: loading edge primitives associated with a first feature and a second feature into a topological model, where the topological model stores edge primitives that are shared by the first feature and the second feature as a single unique shared edge primitive; generalizing respective edge primitives including shared edge primitives to produce corresponding respective generalized edge primitives; and associating generalized edge primitives with the features.

The means may be implemented, for example, as an ASIC programmed to perform feature generalization using a topological model or leveraging topological model functionality. The means may also be implemented as stored computer executable instructions that are presented to computer 500 as data 516 that are temporarily stored in memory 504 and then executed by processor 502.

Logic 530 or computer 500 may also provide means (e.g., hardware, non-transitory computer-readable medium that stores executable instructions, firmware) for performing feature generalization while leveraging functionality typically provided by a topological model. The logic 530 or the computer is a means for: selecting an original edge primitive associated with a feature, where the feature is subject to one or more topological rules; generalizing the original edge primitive to produce a corresponding generalized edge primitive; determining whether the generalized edge primitive violates a topological rule; and when the generalized primitive does not violate a topological rule, associating the generalized edge primitive with the feature for future processing.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods outlined in FIGS. 1-4.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C §101.

"Computer storage medium" as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer storage medium described herein are limited to statutory subject matter under 35 U.S.C §101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer storage medium storing computer-executable instructions that when executed by a computing device cause the computing device to:
    identify primitives associated with a first feature;
    identify primitives associated with a second feature;
    store primitives that are shared by the first feature and the second feature as a single unique shared primitive;
    generalize respective primitives comprising at least one shared primitive to produce corresponding respective generalized primitives;
    associate a generalized primitive corresponding to the shared primitive with the first feature and the second feature; and
    load the generalized primitives into a topological model that is configured to maintain topological relationships between primitives.

2. The non-transitory computer storage medium of claim 1, where the topological model that is configured to maintain topological relationships between primitives in a manner such that when generalizing of an original primitive will violate a topological relationship of the original primitive with respect to another primitive stored in the model, the original primitive is retained in the topological model.

3. The non-transitory computer storage medium of claim 1, where the topological model comprises:
    a node table configured to store nodes, where each node is associated with one or more features; and
    an edge table configured to store feature edges as a pair of end nodes and a set of shape points, where each edge is associated with one or more features.

4. The non-transitory computer storage medium of claim 3, where the topological model comprises:
    a face table configured to store faces associated with a group of edges that form a polygonal region; and
    one or more feature tables configured to store features as a set of primitives or a set of features.

5. The non-transitory computer storage medium of claim 4, where the instructions for generalizing comprise instructions, that when exectuted by the computing device, cause the computing device to:
    select a first set of shape points corresponding to an edge from the edge table;
    smooth the edge to create a second set of shape points that includes fewer shape points than the first set of shape points; and
    store the second set of shape points in the edge table such that the second set of shape points corresponds to the edge in the edge table.

6. The non-transitory computer storage medium of claim 5, where the second set of shape points is a subset of the first set of shape points.

7. The non-transitory computer storage medium of claim 4, where the instructions for generalizing comprise instructions, that when executed by the computing device, cause the computing device to store:
    for each edge associated with one or more features in the edge table:
    generalize the edge to create a corresponding generalized edge; and
    store the generalized edge in the edge table such that the generalized edge is associated with the one or more features.

8. The non-transitory computer storage medium of claim 1, where the instructions further comprise instructions that, when executed by the computing device, cause the computing device to store generalized primitives in feature data such that the generalized primitives are associated with a feature with which a corresponding original primitive was associated.

9. The non-transitory computer storage medium of claim 8, where the instructions for storing comprise instructions, that when executed by the computing device, cause the computing device to store respective pointers in the feature data to respective generalized primitives in a topological model.

10. A computing system, comprising:
a computer processor;
a loader logic configured to cause the computer processor to:
load original primitives associated with a first feature into a topological model; and
load original primitives associated with a second feature into the topological model;
where the topological model stores primitives that are shared by the first feature and the second feature as a single unique shared primitive; and
a primitive generalization logic configured to cause the computer processor to:
select an original shared primitive that is associated, in the topological model, with both the first feature and the second feature;
generalize the original shared primitive to produce a corresponding generalized shared primitive, where each generalized primitive comprises fewer data points than an original primitive from which the generalized primitive was produced; and
load the generalized shared primitive into the topological model such that the generalized shared primitive is associated with the first feature and the second feature and replaces the original shared primitive in the topological model, thereby increasing the speed with which a computer processor renders the first feature and the second feature.

11. The computing system of claim 10, where the topological model comprises electronic storage media storing:
a node table configured to store nodes, where each node is associated with one or more features; and
an edge table configured to store feature edges as a set of shape points, where each edge is associated with one or more features.

12. The computing system of claim 11, where the primitive generalization logic comprises logic to cause the computer processor to:
select a first set of shape points corresponding to an edge from the edge table;
smooth the edge to create a second set of shape points that includes fewer shape points than the first set of shape points; and
store the second set of shape points in the edge table such that the second set of shape points corresponds to the edge in the edge table.

13. The computing system of claim 10, where the primitive generalization logic is configured to cause the computer processor to store respective pointers in the feature data to respective generalized primitives in the topological model.

14. A non-transitory computer storage medium storing computer-executable instructions that when executed by a computing device, computer cause the computing device to:
load primitives associated with a first feature and primitives associated with a second feature into a topological model that is configured to maintain topological relationships between primitives, where the first feature is subject to one or more topological rules;
select an original primitive associated with the first feature;
generalize the original primitive to produce a corresponding generalized primitive;
determine whether the generalized primitive violates a topological rule; and
when the generalized primitive does not violate a topological rule, load the generalized primitive into the topological model such that the generalized primitive is associated with the first feature for future processing.

15. The non-transitory computer storage medium of claim 14, where the instructions further comprise instructions, that when executed by the computing device, cause the computing device to:
identify shared original primitives that are common to two or more features;
assign respective single unique identifiers to respective shared primitives;
generalize one or more shared primitives, such that when a shared primitive is generalized, a single generalized shared primitive results; and
load respective generalized shared primitives into the topological model such that respective shared primitives are associated with respective two or more features that include the respective shared primitives.

16. The non-transitory computer storage medium of claim 14, where the instructions further comprise instructions, that when executed by the computing device, cause the computing device to:
create a node table configured to store nodes, where each node is associated with one or more features; and
create an edge table configured to store feature edges as a set of shape points, where each edge is associated with one or more features.

17. The non-transitory computer storage medium of claim 16, where the instructions for generalizing comprise instructions, that when executed by the computing device, cause the computing device to:
select a first set of shape points corresponding to an edge from the edge table;
smooth the edge to create a second set of shape points that includes fewer nodes than the first set of shape points; and
store the second set of shape points in the edge table such that the second set of shape points corresponds to the edge in the edge table.

18. The non-transitory computer storage medium of claim 14, where the instructions further comprise instructions, that when executed by the computing device, cause the computing device to associate the original shared primitive with the first feature in the topological model for future processing when the generalized primitive violates a topological rule.

19. A computer-implemented method, comprising:
identifying primitives associated with a first feature;
identifying primitives associated with a second feature;
where primitives that are shared by the first feature and the second feature are stored on a computer storage medium as a single unique shared primitive;
generalizing respective primitives comprising at least one shared primitive to produce corresponding respective generalized primitives; and
associating a generalized primitive corresponding to the shared primitive with the first feature and the second feature; and
loading the primitives associated with the first feature and the primitives associated with the second feature into a topological model that is configured to maintain topological relationships between primitives.

20. The computer-implemented method of claim 19, where the topological model is configured to maintain topological relationships between primitives in a manner such that when generalizing of an original primitive will violate a topological relationship of the original primitive with respect to another primitive stored in the model, the original primitive is retained.

21. The computer-implemented method of claim 20, where the topological model comprises:
a node table configured to store nodes, where each node is associated with one or more features; and
an edge table configured to store feature edges as a pair of end nodes and a set of shape points, where each edge is associated with one or more features.

22. The computer-implemented method of claim 21, where the topological model comprises:
a face table configured to store faces associated with a group of edges that form a polygonal region; and
one or more feature tables configured to store features as a set of primitives or a set of features.

23. The computer-implemented method of claim 21, where the generalizing comprises:
selecting a first set of shape points corresponding to an edge from the edge table;
smoothing the edge to create a second set of shape points that includes fewer shape points than the first set of shape points; and
storing the second set of shape points in the edge table such that the second set of shape points corresponds to the edge in the edge table.

24. The computer-implemented method of claim 23, where the second set of shape points is a subset of the first set of shape points.

25. The computer-implemented method of claim 21, where the generalizing comprises:
for each edge associated with one or more features in the edge table:
generalizing the edge to create a corresponding generalized edge; and
storing the generalized edge in the edge table such that the generalized edge is associated with the one or more features.

26. The computer-implemented method of claim 19, further comprising storing generalized primitives in feature data such that the generalized primitives are associated with a feature with which a corresponding original primitive was associated.

27. The computer-implemented method of claim 19, where the storing comprises storing respective pointers in the feature data to respective generalized primitives in a topological model.

28. A computer-implemented method comprising:
loading primitives associated with a first feature and primitives associated with a second feature into a topological model that is configured to maintain topological relationships between primitives, where the first feature is subject to one or more topological rules;
selecting an original primitive associated with the first feature;
generalizing the original primitive to produce a corresponding generalized primitive;
determining whether the generalized primitive violates a topological rule; and
when the generalized primitive does not violate a topological rule, loading the generalized primitive into the topological model such that the generalized primitive is associated with the first feature for future processing.

29. The computer-implemented method of claim 28, further comprising:
identifying shared original primitives that are common to two or more features;
assigning respective single unique identifiers to respective shared primitives;
generalizing one or more shared primitives, such that when a shared primitive is generalized, a single generalized shared primitive results; and
loading respective generalized shared primitives into the topological model such that respective shared primitives are associated with respective two or more features that include the respective shared primitives.

30. The computer-implemented method of claim 28, further comprising:
creating a node table configured to store nodes, where each node is associated with one or more features; and
creating an edge table configured to store feature edges as a set of shape points, where each edge is associated with one or more features.

31. The computer-implemented method of claim 30, where the generalizing comprises:
selecting a first set of shape points corresponding to an edge from the edge table;
smoothing the edge to create a second set of shape points that includes fewer nodes than the first set of shape points; and
storing the second set of shape points in the edge table such that the second set of shape points corresponds to the edge in the edge table.

32. The computer-implemented method of claim 28, further comprising associating the original shared primitive with the first feature for future processing when the generalized primitive violates a topological rule.

* * * * *

UNITED STATES PATENT AND TRADEMARK OFFICE
CERTIFICATE OF CORRECTION

PATENT NO.        : 9,183,435 B2  
APPLICATION NO.   : 14/097388  
DATED             : November 10, 2015  
INVENTOR(S)       : Geringer et al.

Page 1 of 1

It is certified that error appears in the above-identified patent and that said Letters Patent is hereby corrected as shown below:

In the Claims

In column 10, line 42, in claim 5, delete "exectuted" and insert -- executed --, therefor.

Signed and Sealed this
Twenty-eighth Day of June, 2016

Michelle K. Lee
*Director of the United States Patent and Trademark Office*